March 22, 1949.  A. J. BARRY ET AL  2,465,188

ALKYLSILSESQUIOXANES

Filed March 27, 1948

INVENTOR
ARTHUR J. BARRY
JOHN W. GILKEY
BY

ATTORNEY

Patented Mar. 22, 1949

2,465,188

UNITED STATES PATENT OFFICE 2,465,188

ALKYLSILSESQUIOXANES

Arthur J. Barry and John W. Gilkey, Midland, Mich., assignors to Dow Corning Corporation, Midland, Mich., a corporation of Michigan Application March 27, 1948, Serial No. 17,516

6 Claims. (Cl. 260—448.2)

This invention concerns alkylsilsesquioxanes.

Insoluble alkylsilsesquioxanes are known. For instance, when an alkyltrichlorosilane is subjected to hydrolysis, condensation of the hydrolysis products takes place concurrently therewith. Some of the partially condensed materials are soluble. When condensation of such a hydrolyzate is substantially complete these materials are insoluble. These completely condensed insoluble materials, which are known, are of such molecular complexity that the molecular weight can not be determined, though in accordance with general chemical theories of polymers, each piece of such a polymer is constituted of a single molecule.

It is an object of this invention to prepare and provide useful alkylsilsesquioxanes of low molecular weight.

In accordance with the present invention, novel alkylsilsesquioxanes are prepared which have the formula $(RSiO_{1.5})_n$, where R is an alkyl radical containing from 2 to 6, inclusive, carbon atoms, and in which the average degree of polymerization represented by $n$ is a whole number from 8 to 24, inclusive. These new compounds distill at temperatures below 500° C. at an absolute pressure of less than 5 millimeters.

The alkylsilsesquioxanes of this invention are characterized by being three-dimensional in structure, in which respect they differ from previously known low molecular weight organosilicon compounds. In these alkylsilsesquioxanes, each silicon atom has one alkyl radical attached thereto through a carbon-silicon bond, and the remaining valences of said silicon atom are satisfied by oxygen linkage to three other silicon atoms. They are completely condensed polymers, that is, they contain no hydroxyl or other condensable groups.

Figure 1:
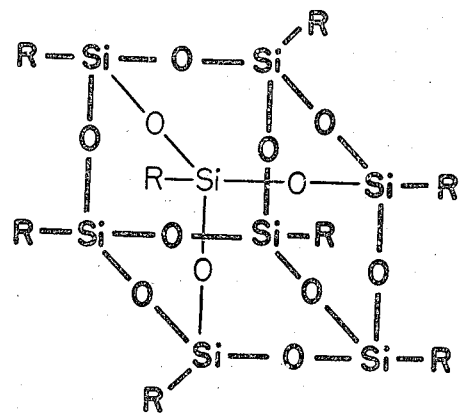
Figure 2:
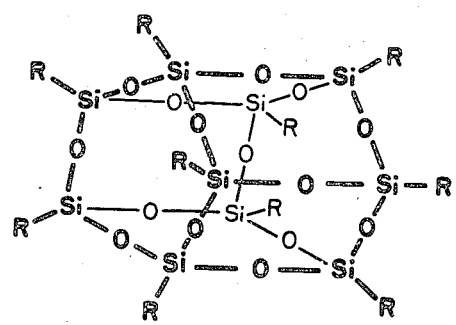
Figure 3:
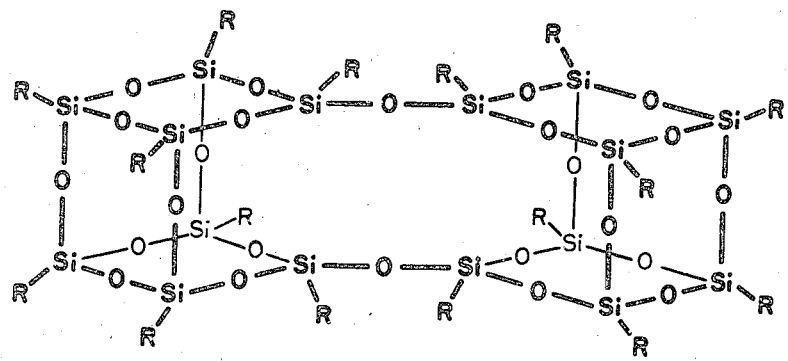

In the accompanying drawings, Figs. 1, 2, and 3 are diagrams illustrative of the bond arrangements of some alkylsilsesquioxanes within the scope of the present invention. They do not purport to show the spatial geometry of the compounds.

A convenient method for the preparation of the alkylsilsesquioxanes of this invention involves destructive distillation of an alkylsilsesquioxane hydrolysate. An alkylsilsesquioxane hydrolysate is the hydrolysis product of a silane of the formula $RSiX_3$, where R is an alkyl radical containing from 2 to 6, inclusive, carbon atoms, and X is a readily hydrolyzable group such as an alkoxy group or a halogen atom. Such hydrolysates may be soluble or insoluble high polymers which may contain residual condensable groups. When condensable hydroxyl groups are present in the alkylsilsesquioxane hydrolysate, and the latter is heated, further condensation ensues with the elimination of water. Thereafter, with continued heating, destructive distillation takes place. The distillation is preferably conducted in mixture with an alkali metal hydroxide, in the proportions of from 0.1 to 10 parts by weight of the latter per 100 parts of the polymer. The polymer is heated, as in a still, to a temperature above 200° C., preferably from 200° to 500° C. and at a pressure of less than 5 mm. The material which vaporizes is withdrawn from the heating zone, collected and condensed. Such overhead fraction comprises a mixture of alkylsilsesquioxane polymers having an average of from 8 to 24 silicon atoms per molecule. Thereafter, the mixture may be separated into its components, for example, by fractional distillation or crystallization.

Some of these new alkylsilsesquioxanes are crystalline, some are liquid in form at ordinary temperatures. They are soluble in solvents such as liquid aromatic hydrocarbons and linear organosiloxanes. To some extent they are also soluble in ketones.

These new compounds, being completely condensed, are stable at ordinary temperatures for long periods of time. The liquid compounds may be employed as lubricants, damping fluids and the like, in instances where temperatures of operation are below about 150° C. When heated at temperatures above 150° C., these new alkylsilsesquioxanes undergo rearrangement with the formation of insoluble resinous materials. Such rearrangement and polymerization proceeds even more readily in the presence of a small amount of a catalyst such as an alkali metal hydroxide or an organo-metallic salt such as lead naphthenate. The compounds of this invention are accordingly useful as coatings, adhesives, potting compounds and the like, because of said property of being convertible to hard, insoluble resins, without the elimination of water. This property of setting without the elimination of water due to condensation prevents bubbling of the resins during setting.

Probable bond arrangements of some of these silsesquioxanes are illustrated in the accompanying drawings. The molecular arrangement for compounds, the molecular weight of which shows that the compound contains eight silsesquioxane units per molecule, is shown in Fig. 1. This arrangement involves two cycloetetrasiloxane rings with each of the silicon atoms of one ring linked by a siloxane linkage with a silicon atom of the other ring. The structures shown in Figs. 2 and 3 illustrate compounds having 10 and 16 units per molecule. The structure in Fig. 2 involves two linked pentasiloxane rings, whereas the structure in Fig. 3 involves two structures of the type shown in Fig. 1, but in which two adjacent silicon atoms of one of these structures are linked by siloxane linkage to two adjacent silicon atoms of the other structure.

The following examples are illustrative of this invention, but are not to be construed as limiting its scope:

Example 1

To 1000 grams of propyltrichlorosilane, $C_3H_7SiCl_3$, in 2 liters of diethyl ether were added slowly 500 grams of water. The reaction mixture was maintained at 25° C. during the addition. The ether layer was removed, washed several times with water, then ammonia was bubbled through, and the product was again washed with water. After removal of ether and water, there remained a colorless, very viscous oil. A portion of this oil was allowed to stand at room temperature. It set to a gel after a few days.

To 385 grams of the oily product of hydrolysis were added 7.7 grams of powdered sodium hydroxide. The mixture was heated on a molten metal bath, the temperature of which was about 380° C., and the volatile products were collected and condensed. Water collected in a cold trap attached to the condenser. The principal product distilled at a temperature within the range of from 200° to 270° C. at an absolute pressure of from 0.1 to 0.15 millimeter. It amounted to 333 grams and was paste-like at room temperature. It was soluble in solvents such as toluene, hexamethyldisiloxane, and cyclohexane. A molecular weight determination in cyclohexane gave an average value of 1033.

A portion of the paste was dissolved in hot acetone. Upon cooling, crystals formed and were removed. From 35 to 50 per cent by weight of the paste originally dissolved was recovered as crystalline material. Molecular weight determinations on the crystals in cyclohexane and in benzene, showed that this silsesquioxane was $(C_3H_7SiO_{1.5})_8$. The crystals melted at 219°–220° C.

Following removal of the crystals, the acetone was volatilized. The residue was a viscous oil, which did not change in properties after exposure to air for several weeks at ordinary temperatures. It consisted of a mixture of propylsilsesquioxane polymers, containing an average number of silicon atoms per molecule within the range of 14 to 17.

A portion of the paste was admixed with a small amount of lead napthenate, and the mixture was heated at 200° C. It set to a tough, clear resin.

Example 2

Ethyltrichlorosilane was reacted with water, by the procedure described in Example 1. 100 parts of the clear, viscous oily product so obtained was condensed by heating, to a glassy material, which was broken into small pieces. 6 parts of powdered sodium hydroxide was added and the mixture was heated on a molten lead bath. Product distilled at a vapor temperature of 190°–220° C. at 1–7 millimeters absolute pressure and was collected. It was paste-like at ordinary temperatures.

The paste was dissolved in hot acetone. Upon cooling, crystals formed and were removed. They did not melt at 250° C. Analysis and molecular weight determination showed the crystals to be of a composition corresponding to the formula $(C_2H_5SiO_{1.5})_8$.

Another portion of the paste was dissolved in hexamethyldisiloxane. The crystalline silsesquioxane was crystallized on cooling and evaporation of the solvent. The remaining uncrystallized material was a viscous oil.

Example 3

By hydrolysis of n-butyltrichlorosilane a very viscous oil was obtained. A mixture of 100 parts by weight of this oil and 3 parts of sodium hydroxide was heated, and the volatile products were collected and condensed. Water collected in a cold trap attached to the condenser. Material distilling at from 220° to 320° C. at 0.5–1.1 millimeters absolute pressure was an oily paste at ordinary temperatures. A molecular weight determination showed that this paste had an average of 10.9 butylsilsesquioxane units per molecule.

The oily paste was dissolved in hot acetone. Upon cooling, crystals were obtained which had a melting point between 190° and 195° C. Molecular weight determination and chemical analysis showed the crystals to have a composition corresponding to the formula $(C_4H_9SiO_{1.5})_8$. The residual portion of the paste was an oil.

The paste was polymerized to a high viscosity fluid by heating at 200° C. for six hours with an alkali metal alcoholate in amount of one alkali metal atom per 300 silicon atoms.

Example 4

$C_6H_{13}SiCl_3$ was hydrolyzed whereby a clear, fairly viscous oil was obtained.

To 140 grams of the oily material were added 4.2 grams of solid sodium hydroxide. The mixture was heated at a pot temperature of 320°–380° C. under an absolute pressure of 2.0–2.5 millimeters. There was taken off overhead material distilling at from 290° to 325° C., and principally at 300°–308° C., at said pressure. The distillate amounted to 116 grams of a clear oil, which had a viscosity of 820 centistokes at 20.0° C. Analysis of the oil and molecular weight determination showed it to be a mixture of polymers containing an average of 14.8 units of the formula $(C_6H_{13}SiO_{1.5})$. Water collected in the cold trap.

The distillate did not change appreciably in viscosity after standing at room temperature for several days.

The oil was found to have desirable properties as a lubricating agent.

That which is claimed is:

1. Distillable monoalkylsilsesquioxanes having the formula $(RSiO_{1.5})_n$, in which R is an alkyl radical containing from 2 to 6, inclusive, carbon atoms, and in which the average degree of polymerization represented by $n$ is from 8 to 24, inclusive.

2. Monoalkylsilsesquioxanes in accordance with claim 1 in which R represents ethyl.

3. Monoalkylsilsesquioxanes in accordance with claim 1 in which R represents propyl.

4. Monoalkylsilsesquioxanes in accordance with claim 1 in which R represents hexyl.

5. A monoalkylsilsesquioxane having the formula $(RSiO_{1.5})_8$ where R is an alkyl radical containing from 2 to 6, inclusive, carbon atoms.

6. The method which comprises heating at above 200° C. and at a pressure of less than 5 mm. an incompletely condensed alkylsilsesquioxane polymer in which the alkyl radical contains from 2 to 6 carbon atoms, in contact with an alkali metal hydroxide whereby completely condensed soluble polymers are produced which contain from 8 to 24 of the alkylsilsesquioxane units per molecule.

ARTHUR J. BARRY.
JOHN W. GILKEY.

REFERENCES CITED

The following references are of record in the file of this patent:

UNITED STATES PATENTS

| Number    | Name  | Date          |
|-----------|-------|---------------|
| 2,418,051 | Scott | Mar. 25, 1947 |
| 2,438,478 | Hyde  | Mar. 23, 1948 |

OTHER REFERENCES

Scott, "Jour. Amer. Chem. Soc." vol. 68 (1946), pages 356–358.